United States Patent [19]

Liang et al.

[11] Patent Number: 5,393,947
[45] Date of Patent: Feb. 28, 1995

[54] METHOD AND DEVICE FOR CONTROLLING A WIRE CUT ELECTRIC DISCHARGING MACHINE

[75] Inventors: Re-Fang Liang; Yu-Chin Wang; Hsin-Jung Chuang, all of Hsinchu, Taiwan, Prov. of China

[73] Assignee: Industrial Technology Research Institute, Hsinchu, Taiwan, Prov. of China

[21] Appl. No.: 157,997

[22] Filed: Nov. 26, 1993

[51] Int. Cl.⁶ .......................... B23H 1/02; B23H 7/04
[52] U.S. Cl. .............................. 219/69.18; 219/69.12
[58] Field of Search ................ 219/69.13, 69.18, 69.12

[56] References Cited

U.S. PATENT DOCUMENTS

| | | | |
|---|---|---|---|
| 3,365,612 | 1/1968 | Schierholt | 219/69.13 |
| 4,614,854 | 9/1986 | Obara et al. | 219/69.13 |
| 4,695,696 | 9/1987 | Ozaki et al. | 219/69.18 |
| 4,945,199 | 7/1990 | Tanaka et al. | 219/69.13 |
| 5,162,631 | 10/1992 | Hachisuka et al. | 219/69.13 |

FOREIGN PATENT DOCUMENTS

| | | | |
|---|---|---|---|
| 61-297015 | 12/1986 | Japan | 219/69.18 |
| 4-354621 | 12/1992 | Japan | 219/69.13 |

*Primary Examiner*—Geoffrey S. Evans
*Attorney, Agent, or Firm*—W. Wayne Liauh

[57] ABSTRACT

A device for controlling a wire cut electric discharging machine is provided with a testing circuit to detect the condition between the wire electrode and the workpiece before every discharge process so as to regulate the discharge energy according to one of the detected conditions: normal discharge, arc discharge, or short circuit. The device includes two switching transistors controlled by a control unit according to the comparison result between a reference voltage and the voltage measured between the wire electrode and the workpiece being processed.

2 Claims, 5 Drawing Sheets

METHOD AND DEVICE FOR CONTROLLING A WIRE CUT ELECTRIC DISCHARGING MACHINE

FIELD OF THE INVENTION

The present invention relates to a method and device for controlling the electric discharge of a wire cut electric discharging machine. The device of this invention detects the conditions of the wire electrode to determine its status as one the three conditions: normal discharge, arc discharge, or short-circuit, before each discharging process, so as to control the operation of electric discharge according to the detected conditions.

BACKGROUND OF THE INVENTION

In order to let a wire cut electric discharging machine (hereinafter as wire cut EDM) achieve a high processing speed, a huge current must be provided, and therefore a large amount of energy must be supplied to the gap between the wire electrode of the wire cut EDM and the workpiece within a very short period of time (<3 uS) for processing a workpiece. However, supplying a large amount of energy to the gap between the wire electrode and the workpiece during a poor condition may cause the wire electrode to be broken. Therefore, the amount of energy must be controlled during the process of discharge.

A conventional discharge control circuit of a wire cut EDM, as shown in FIG. 1, is a transistor-capacitor circuit generally comprising a current limit resistor 3 connected in series to a power source 1, a transistor 4, a capacitor 2, and a wire electrode 5. As the wire electrode 5 approaches the workpiece, the capacitor starts to discharge, and to produce an electric discharge between wire electrode 5 and workpiece 6 to perform a cutting process. Because of the limitation of charging and discharging time of the capacitor and the problem of energy control during the discharging of the capacitor, the wire cut EDM cannot achieve a high processing speed.

SUMMARY OF THE INVENTION

The present invention has been accomplished to solve the above said problem. In one aspect the present invention offers a novel method for controlling a wire cut EDM such that the discharge current of the wire cut EDM is controlled within a predetermined range and also the processing speed is improved. In another aspect the present invention offers a novel device for controlling a wire cut EDM such that said device comprises a main circuit for supplying the discharge current to the wire electrode and a testing circuit for supplying a testing voltage to the wire electrode and workpiece. The main circuit includes a high voltage power source and a first switching transistor operated by a control unit containing a pulse generator [hereinafter simply as a control unit], and the testing circuit includes a low voltage power source, a second switching transistor, a resistor, and a diode, wherein the second switching transistor is also operated by the same control unit. The control unit is used to detect the voltage drop between the wire electrode and the workpiece to determine whether the gap between the wire electrode and the workpiece is within a predetermined range suitable for discharging operation. If it is within the predetermined range, the first switching transistor is turned on to allow a large amount of current to be supplied to the wire electrode from the high voltage power source, and at the same time the second switching transistor is turned off for a period of time to cut off the supply of the test voltage from the low voltage power source, and then turned on to test the voltage drop in the gap between the wire electrode and the workpiece again. The device of the invention thus eliminates the capacitor and the current limiting resistor used in the conventional wire cut EDM, and as a result the possibility of breakage of the wire electrode by an overcurrent is minimized, and the processing speed is improved. Only a small amount of current passes through the resistor employed in the testing circuit, and therefore the resistor employed in the device of this invention does not present any problem.

The method of the present invention comprises the following steps:

i) applying a testing voltage between the wire electrode of a wire cut EDM and the workpiece to be processed;

ii) detecting the voltage between the wire electrode and the workpiece after a period of time after the application of the detection voltage, so as to determine the next discharge as a normal discharge when the detected voltage is higher than a predetermined reference voltage, or an arc discharge when the detected voltage is lower than the predetermined reference voltage;

iii) giving a different discharging time (ON TIME) according to predetermined different discharge conditions when the detection voltage between the wire electrode and the workpiece has dropped;

iv) giving a different length of OFF TIME according to different conditions between the wire electrode and the workpiece, permitting the wire electrode to be insulated from the workpiece;

v) regarding the circuit as short circuited if the detection voltage applied between the wire electrode and the workpiece is always below the predetermined reference voltage;

vi) stopping from sending out discharge energy and directly entering a period of off time when a short-circuit occurs; and vii) regarding the circuit still at the condition of short circuit if an arc discharge is detected before the testing voltage is turned on again; or regarding the short-circuit eliminated if a normal discharge is detected before the testing voltage is turned on again.

The discharge control device according to the present invention comprises:

a high voltage power source to provide a discharge energy between the wire electrode of a wire cut EDM and the workpiece to be processed, the negative terminal of the high voltage power source being connected to the wire electrode of the wire cut EDM;

a first switch having one end connected to the positive terminal of high voltage power source and an opposite end connected to the workpiece to be processed;

a low voltage power source to provide an ignition voltage between the wire electrode and the workpiece, the negative terminal of the low voltage power source being connected to the wire electrode;

a diode having its positive terminal connected to the positive terminal of the low voltage power source;

a resistor having one end connected to the negative terminal of the diode;

a second switch having one end connected to the opposite end of the resistor and an opposite end connected to the workpiece; and a control unit connected to the first switch and the second switch to control the operation of the first and second switches by comparing the voltage detected between the wire electrode and the workpiece with a reference voltage.

DETAILED DESCRIPTION OF THE PREFERRED EMBODIMENTS

Figure 1:
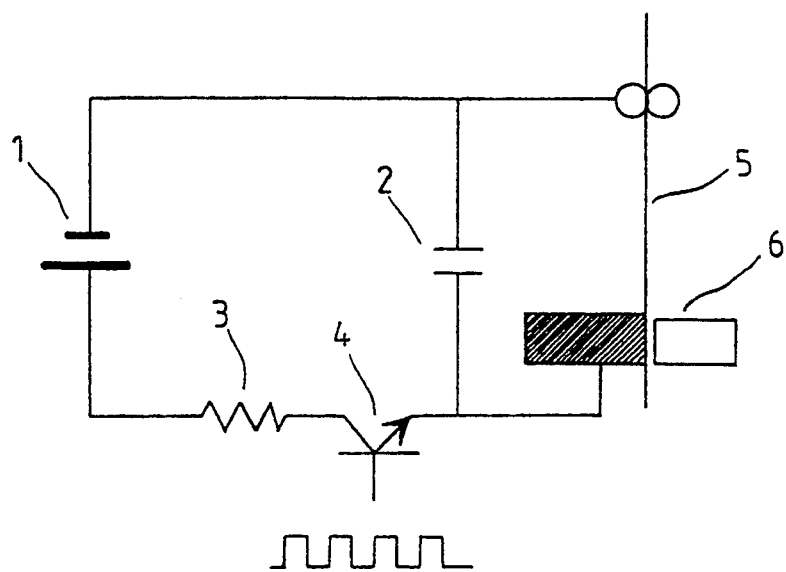
FIG. 1 is a circuit diagram of a discharge control circuit for a wire cut EDM according to the prior art.
Figure 2:
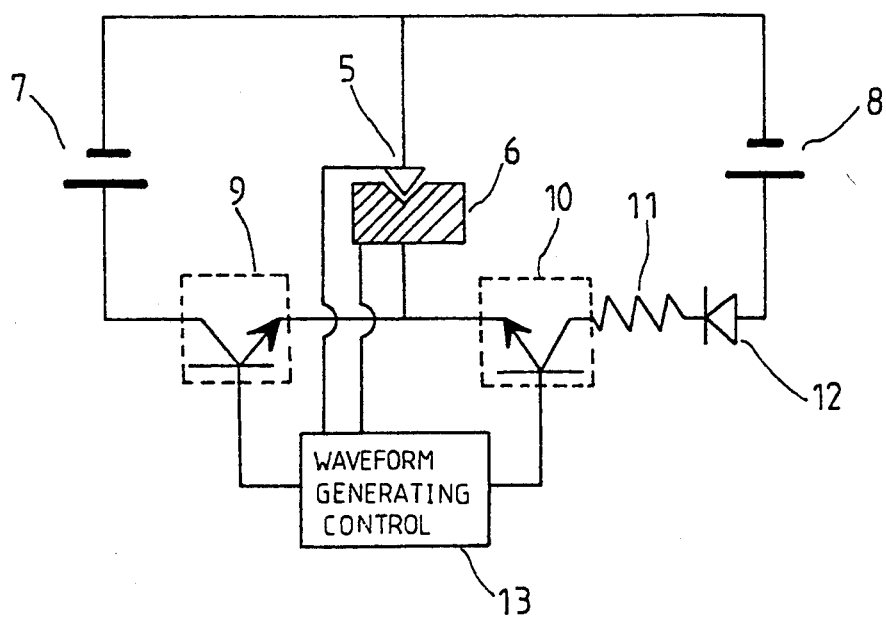
FIG. 2 is a circuit diagram of a discharge control circuit for a wire cut EDM according to the present invention.

Referring to FIG. 2, the discharge control device of the present invention comprises a wire electrode 5, a workpiece 6, a high voltage power source 7, a low voltage power source 8, a first switching transistor 9, a second switching transistor 10, a resistor 11, a diode 12, and a waveform generating control 13. The low voltage power source 8 provides the necessary testing voltage for detecting the voltage drop of the gap between the electrode 5 and workpiece 6. The resistor 11 is a current limiting resistor installed in the testing circuit to limit the testing current within a limited range during the discharge of the electrode 5. The diode 12 prevents reverse flow of high voltage from the high voltage power source 7 to the low voltage power source 8 during the discharge of the electrode 5. The operation of the first switching transistor 9 and the second switching transistor 10 is controlled by the waveform generating control 13. As the second switching transistor 10 is turned on, a voltage drop Vg occurs between the electrode 5 and the workpiece 6. The voltage drop Vg is then compared with the reference voltage Vref by a comparator 16 (see FIG. 3). If the comparison result shows that Vg is higher than Vref, thus the voltage drop is regarded as a normal discharge. On the contrary, if the comparison result shows that Vg is lower than Vref, the voltage drop is regarded as an arc discharge. If it is a normal discharge, the waveform and time series are as shown in FIG. 4 (this will be described further). When an arc discharge is detected by comparator 16, i.e. Vg is lower than Vref, the waveform generating control 13 immediately turns off the second switching transistor 10 and simultaneously turns on the first switching transistor 9, causing a period of ON TIME (normal discharge) to start. On the contrary, if Vg≦Vref, the waveform generating control 13 immediately turns off the second switching transistor 10 and simultaneously turns on the first switching transistor 9, causing a period of ARC ON TIME (arc discharge) to start. After the period of ARC ON TIME, the discharging circuit does no work for a period of time to let the electrode be insulated for the next discharging process. The waveform and time series of the arc discharge are as shown in FIG. 5.

Figure 3:
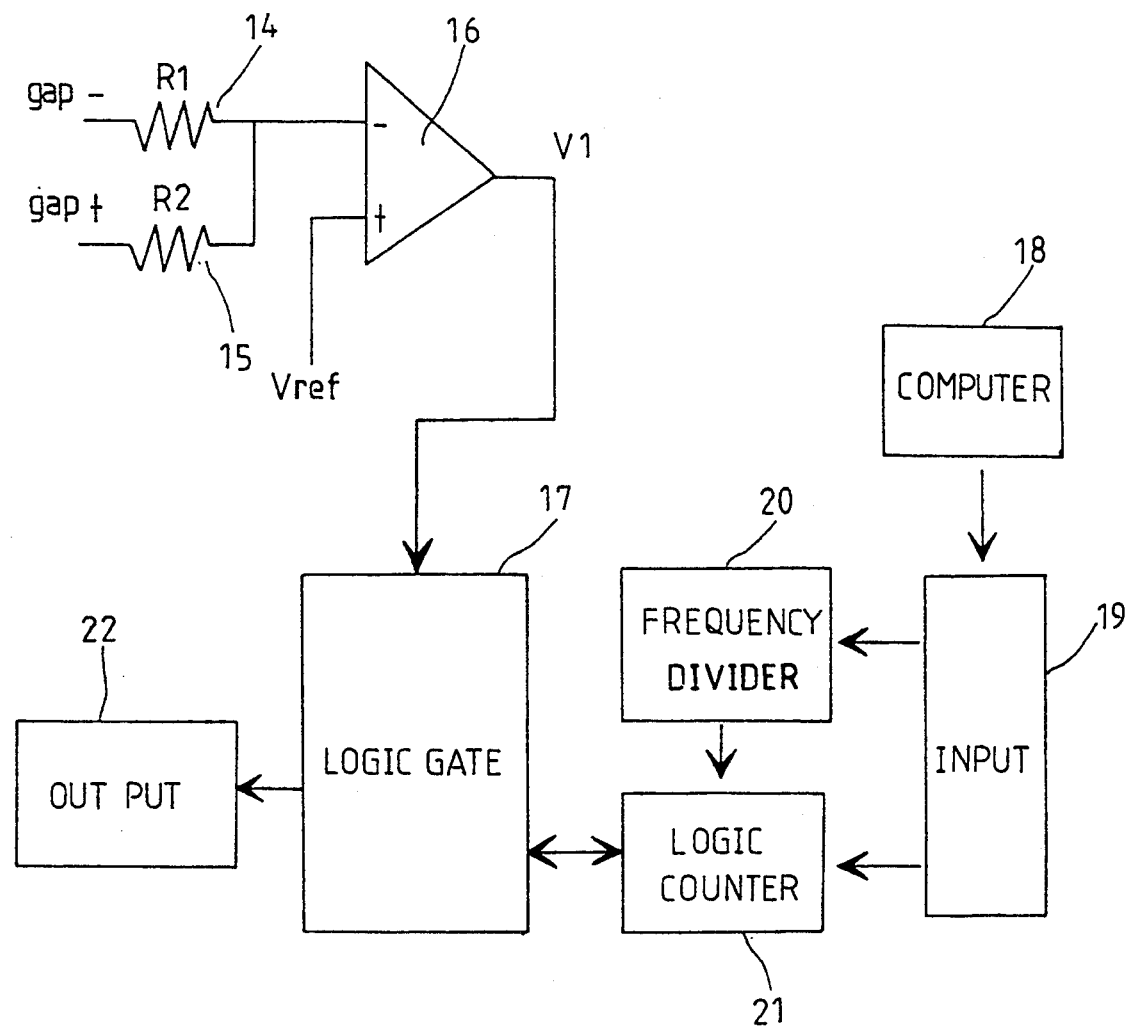
FIG. 3 is a block diagram of the control unit of the discharge control device of FIG. 2.
Figure 4:
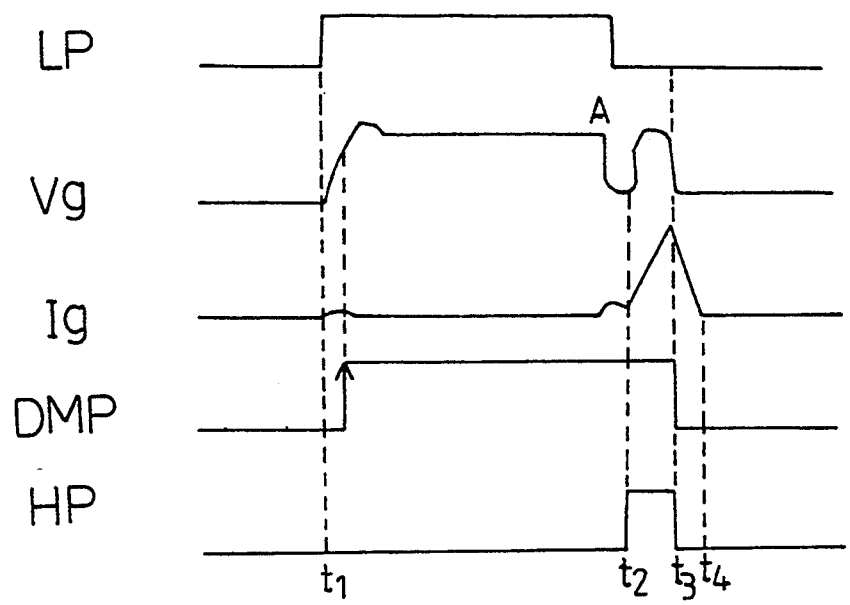
FIG. 4 is a waveform and time series chart of normal discharge according to the present invention.

Referring to FIG. 3, therein illustrated is a block diagram of the waveform generating control 13. The voltage drop Vg between the electrode (gap−) and the workpiece (gap+) is compared with the reference voltage Vref by the comparator 16, and then the comparison result is sent to a logic gate 17 for the determination of a normal discharge or an arc discharge. The signal value of the waveform generating control 13 is set by the computer 18 through the input port 19 and then sent through the frequency divides 20 causing it to provide clock pulses to the logic counter 21. As soon as the counting of the counter 21 reaches the predetermined value, a signal is sent to the logic gate 17 for the determination of normal discharge or arc discharge, and therefore a corresponding output signal is sent through the output port 22.

Referring to FIG. 4, therein illustrated is a waveform and time series chart of a normal discharge according to the present invention. LP shows the waveform of the voltage sent from the waveform generating control 13 to the second switching transistor 10; Vg shows the waveform of the voltage between the electrode 5 and the workpiece 6; Ig shows the waveform of the current corresponding to Vg; DMP shows the waveform of the voltage within the period after a certain length of delay after the second switching transistor 10 was switched on (about the time that Vg rises) until the termination of the normal discharge (NORMAL ON TIME); Hp shows the waveform of the voltage sent from the waveform generating control 13 to the first transistor switch 9. As indicated, the voltage Vg between the electrode 5 and the workpiece 6 starts to rise when the second switching transistor 10 is turned on by the waveform generating control 13 at the time t1 due to the boosting of Lp. When Vg is compared with the reference voltage Vref by the comparator 16 of the waveform generating control 13 and the comparison result shows Vg>Vref, normal discharge is prepared to start. When the comparator 16 detects that Vg becomes lower than the reference voltage Vref, the waveform generating control 13 drops Lp to zero so as to turn off the second switching transistor 10 and simultaneously to boost Hp, and therefore the first switching transistor 9 is turned on. When the first switching transistor 9 is turned on after the second switching transistor 10 was turned off, the voltage Vg will drop and the immediately rise as shown in part A in FIG. 4. In FIG. 4, the time period between t2 and t3 is the time of the normal discharge. During the time of the normal discharge between t2 and t3, the first switching transistor 9 is electrically connected, however the actual discharge current Ig will be delayed till t4.

Figure 5:
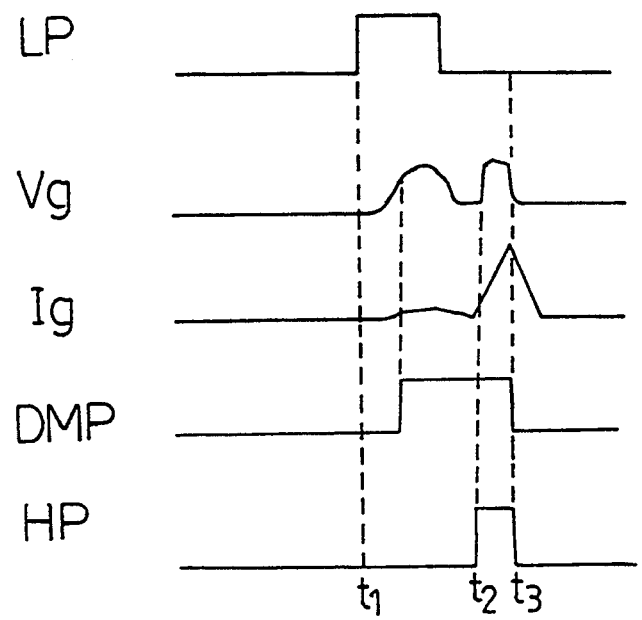
FIG. 5 is a waveform and time series chart of arc discharge according to the present invention.

Referring to FIG. 5, therein illustrated is a waveform and time series chart of an arc discharge according to the present invention. When Vg is detected by the comparator 16 of the waveform generating control 13 that Vg≦Vref, the waveform generating control 13 immediately turns off the second switching transistor switch 10 and then turns on the first switching transistor 9 so as to start an arc discharge. The time period between t2 and t3 is the time of the arc discharge.

Figure 6:
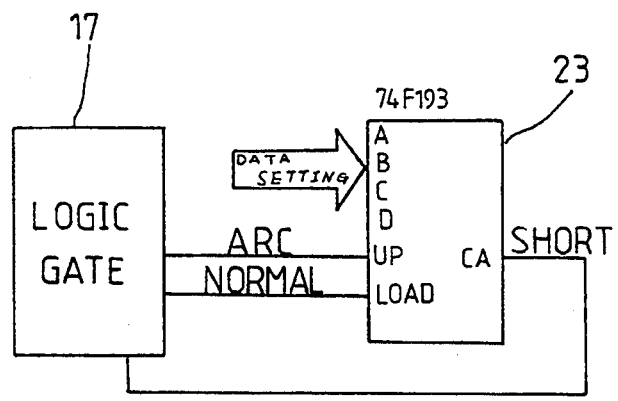
FIG. 6 is a circuit diagram of a short-circuit detection & protective circuit for the discharge control circuit of FIG. 2.
Figure 7:
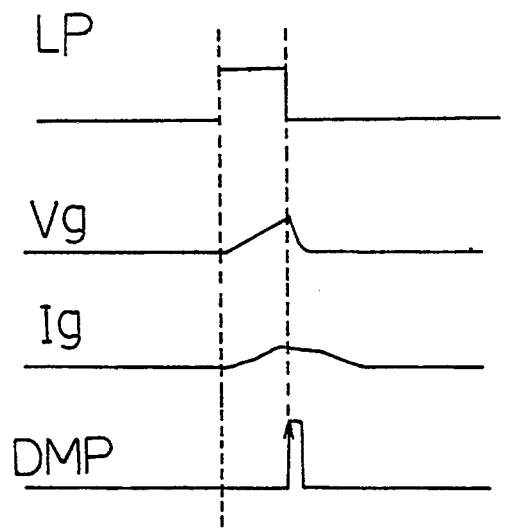
FIG. 7 is a waveform and time series chart of the discharge control circuit of FIG. 2 at the status of short-circuit.

Referring to FIG. 6, therein shown is a short-circuit detection & protective circuit for the discharge control circuit. The short-circuit detection circuit is comprised of a counter 23 which counts up one when arc discharge occurs. As the counted value becomes equal to the pre-set value, the output of the counter 23 becomes high, showing the occurrence of a short-circuit. When a short-circuit occurs, the discharging circuit enters the waveform time series shown in FIG. 7 there is no discharge provided, namely, the discharging circuit directly enters the off time, and waits for the next cycle. If there is a normal discharge during the continuous counting procedure of the counter 23, the reading of the counter 23 will be cleared, permitting the counter 23 to start counting from zero.

Figure 8:
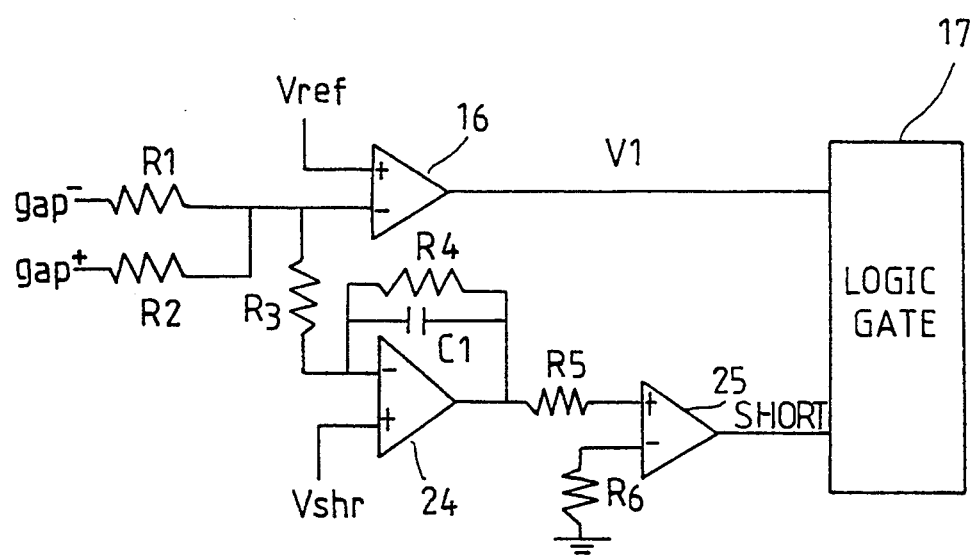
FIG. 8 is a circuit diagram of an alternate form of the short-circuit detection & protective circuit for the discharge control circuit of FIG. 2.

FIG. 8 therein illustrated is an alternate form of the short-circuit detection & protective circuit, which uses two comparator circuits to detect the three discharge conditions, namely, the normal discharge, the arc discharge, and the short-circuit. The first comparator circuit 16 checks the waveform so as to determine if it is a normal discharge or an arc discharge. The second comparator circuit comprises a low pass filter (R3 and C,), an amplifier 24, and a comparator 25. The low pass filter filtrates the voltage obtained between the electrode and the workpiece so as to provide an average voltage value for comparison with the reference voltage Vshr. If the comparison result shows that the voltage obtained is lower than the reference voltage Vshr, the output of the amplifier 24 becomes higher than zero. The output of the amplifier 24 is then sent to the comparator 25 causing the comparator 25 to provide a high potential output for indication of the occurrence of a short circuit.

As described above, the discharge control method and device of the present invention is employed a circuit with a control unit as shown in FIG. 2, to control the operation of the first and second switching transistors 9 and 10. The discharge control method includes steps in proper order as follows:

i) to apply a testing voltage between the electrode.

ii) to detect the voltage between the electrode after a period of time after the application of the detection voltage, and to determine the next discharge as a normal discharge when the detected voltage is higher than a predetermined reference voltage, or an arc discharge when the detected voltage is lower than the predetermined reference voltage.

iii) to give a different length of ON TIME according to predetermined different discharge conditions when the detection voltage drops. The arrangement of giving a different length of ON TIME according to different discharge conditions can prevent the wire electrode from being broken by an overdischarge, and can also improve the processing speed.

iv) to give a different length of OFF TIME according to different conditions between the wire electrode and the workpiece permitting the electrode to be insulated from the workpiece.

v) to regard the circuit as short circuited if the testing voltage applied between the wire electrode and the workpiece is always below the predetermined reference voltage.

vi) the wire electrode may be broken if a voltage is applied between the electrode and the workpiece during the occurrence of a short-circuit. Therefore, discharge energy is not released when a short-circuit occurs, and the discharging circuit enters a period of off time until the testing voltage is turned on again. When an arc discharge is detected before the testing voltage is turned on again, it is regarded still at the condition of short-circuit; the short-circuit is regarded as having been eliminated if a normal discharge is detected.

vii) the aforedescribed detecting method controls the energy of each discharge within the most suitable range, and therefore a high speed processing process is achieved without breaking the wire electrode.

While only a few embodiments of the present invention have been shown and described, it will be understood that various modifications and changes could be made without departing from the spirit and scope of the invention.

What is claimed is:

1. A control device for controlling an electric discharge of a wire cut electric discharging machine comprising:

(a) a first power source to provide a discharge energy between a wire electrode and a workpiece to be processed, said first power source having a negative terminal connected to said wire electrode of said wire cut EDM, and a positive terminal;

(b) a first switching means having a first end connected to the positive terminal of said first power source and a second end connected to said workpiece to be processed;

(c) a second power source to provide a testing voltage between said wire electrode and said workpiece, said second power source having a negative terminal connected to said wire electrode, and a positive terminal;

(d) a diode having a positive terminal connected to said positive terminal of said second power source, and a negative terminal;

(e) a resistor having a first end connected to the negative terminal of said diode, and a second end;

(f) a second switching means having a first end connected to said second end of said resistor and a second end connected to said workpiece; and (g) a control unit connected between said first switch and said second switch to compare the voltage between said wire electrode and said workpiece with a reference voltage to obtain a comparison result, and to control an operation of said first switching means and said second switching means according to said comparison result;

(h) wherein said control unit comprises:
  a first comparator connected to said first power source to compare said testing voltage between said wire electrode and said workpiece supplied by said second power source with said reference voltage;
  said comparator causing said first power source to induce a normal discharge when said testing voltage is higher than said reference voltage, or an arc discharge when said testing voltage is lower than said reference voltage;
  a logic gate to receive said comparison result from said first comparator, a first counter, and a frequency divider controlled by a computer to provide a timed pulse to said first counter, said logic gate being driven by said first counter to provide an output in accordance with said comparison result received from said first comparator when said first counter has reached a predetermined count value; and
  a second counter, said second counter counting one each time said voltage supplied from said first power source induces an arc discharge between said wire electrode and said workpiece, said second counter providing an output to the logic gate for a determination of said normal discharge or said arc discharge, when a total count of said second counter reaches a preset value, said second counter being adapted to be reset to zero and start counting from zero when a normal discharge is detected during the counting.

2. The wire cut electric discharging machine control device of claim 1 wherein said control unit further comprises a low pass filter and a second comparator, said low pass filter being adapted to filtrate said testing voltage obtained between said wire electrode and said workpiece so as to provide an average voltage for comparison with said reference voltage for outputting to said logic gate by said second comparator for a determination of a short circuit between said wire electrode and said workpiece.

* * * * *